United States Patent [19]

Fujimoto et al.

[11] 4,015,239
[45] Mar. 29, 1977

[54] CHARACTER RECOGNITION APPARATUS

[75] Inventors: Yoshiji Fujimoto; Shozo Kadota, both of Hachioji, Japan

[73] Assignee: Hitachi, Ltd., Japan

[22] Filed: Oct. 21, 1975

[21] Appl. No.: 624,339

[30] Foreign Application Priority Data

Oct. 21, 1974 Japan ............................ 49-120393

[52] U.S. Cl. .................. 340/146.3 H; 340/146.3 D
[51] Int. Cl.² .......................................... G06K 9/12
[58] Field of Search .......... 340/146.3 AE, 146.3 H, 340/146.3 D, 146.3 E, 146.3 Q, 146.3 MA

[56] References Cited

UNITED STATES PATENTS

| | | | |
|---|---|---|---|
| 3,292,149 | 12/1966 | Bourne | 340/146.3 E |
| 3,381,274 | 4/1968 | Quade et al. | 340/146.3 D |
| 3,503,043 | 3/1970 | Brass | 340/146.3 D |
| 3,863,218 | 1/1975 | Oka et al. | 340/146.3 AE |

OTHER PUBLICATIONS

Angibeaud, "Pattern Recognition," IBM Tech. Disclosure Bulletin, vol. 18, No. 5, Oct. 1975, pp. 1461–1464.

*Primary Examiner*—Leo H. Boudreau
*Attorney, Agent, or Firm*—Craig & Antonelli

[57] ABSTRACT

Character recognition apparatus which converts two dimensional feature information derived from an unknown character into one dimensional feature information, such as a code train, and recognizes the unknown character by comparing the converted one dimensional feature information with corresponding information relating to selected reference characters.

The starting point of the one dimensional feature information representing the unknown character is selected by scanning the terminal points of the unknown character in a direction predetermined for each particular reference character as indicated by a scan parameter stored with the one dimensional feature information of the reference character. The starting point is then selected on the basis of a relationship including the scan parameter of the reference character and the feature points of the unknown character.

5 Claims, 13 Drawing Figures

| FEATURE POINT ADDRESS | X | Y |
|---|---|---|
| TERMINAL POINT 1 | 11 | 5 |
| 2 | 10 | 10 |
| 3 | 6 | 23 |
| 4 | 10 | 28 |
| BRANCH POINT 1 | 10 | 23 |

FIG. 7

| SCAN PARAMETER | A | B |
|---|---|---|
| 0 | 32 | 1 |
| 1 | 1 | 32 |
| 2 | -32 | 1 |
| 3 | 1 | -32 |
| 4 | 1 | 1 |
| 5 | -1 | 1 |
| 6 | -1 | -1 |
| 7 | 1 | -1 |
| 8 | 1 | 2 |
| 9 | -2 | 1 |
| 10 | -1 | -2 |
| 11 | 2 | -1 |
| 12 | 2 | 1 |
| 13 | -1 | 2 |
| 14 | -2 | -1 |
| 15 | 1 | -2 |

CHARACTER RECOGNITION APPARATUS

BACKGROUND OF THE INVENTION

1. Field of the Invention

This invention relates to character recognition apparatus, and in particular, to the portion of such apparatus for converting the two dimensional feature information derived from an unknown character into one dimensional feature information, such as a sequence of code trains, in order to compare the code trains with those of the reference characters.

2. Description of the Prior Art

Many kinds of character recognition apparatus have been proposed, in some of which, an unknown character to be recognized is first transformed to a quantized matrix signal, namely, two dimensional information after certain preliminary processing, such as rejecting noise components and thinning the lines of the character in order to reduce redundancy and constitute a line width of one bit.

Then, the features of the character, such as the terminal points, the branch points and the line directions, are detected from the matrix signal and stored in a table. Thereafter, the features of the table are selectively combined and transformed into a plurality of code sequences, that is, into one dimensional information for comparison with selected reference characters and designation as an associated character upon identification thereof with a reference character in the dictionary, while being rejected upon nonidentification.

In the process of converting the two dimensional information of a character into one dimensional information in this type of character recognition apparatus, the sequence of the plurality of codes becomes different in dependence on the selection of the start point of the one dimensional information. Therefore, it is very important to determine where the starting point is. Although it seems reasonable to select the left upper terminal point as the starting point, there are many drawbacks when the scanning direction to detect the starting point is limited to a fixed direction.

Especially, in the case of recognizing hand written characters, the starting point is often different according to the personality of the writer, as will be described later. In such a case, the character recognition apparatus must be provided with a memory capable of storing several code trains for each reference character.

SUMMARY OF THE INVENTION

For the reasons given above the main object of this invention is to provide a character recognition apparatus to effectively convert two dimensional feature information on an unknown character to be recognized into one dimentional feature information, that is, into a code train.

Another object of this invention is to provide a character recognition apparatus with rather simple circuits to reliably recognize an unknown handwritten character.

In order to attain these objects, a character recognition apparatus includes a device capable of obtaining two dimensional information which is stored in a matrix of storage elements, each of which stores a binary value 0 or 1, a feature detecting circuit detecting features of characters such as terminal points, branch points and line directions of the unknown character from the two dimensional information, a processing circuit for selectively combining a code signal representing each of the line elements according to predetermined rules and converting them into a sequence of a plurality of codes, that is, a code train, a reference character memory in which the code trains assigned to each of the reference characters obtained by the same method mentioned above are recorded, and a matching circuit which compares successively the code train of the unknown character with those of the reference characters. This invention is characterized by the fact that a scan parameter particular to each of the reference characters is stored together with the code train in the reference character memory, and also by the fact that there is provided a starting point detecting circuit in which the starting point to be used for converting the two dimensional information into the code train or one dimensional information, is detected by scanning the terminal points of the unknown character in the direction presented by the scanning parameter of a reference character.

The other objects and features of this invention will be apparent from the following detailed description when read in conjunction with the accompanying drawings.

DESCRIPTION OF THE PREFERRED EMBODIMENTS

Figure 1:
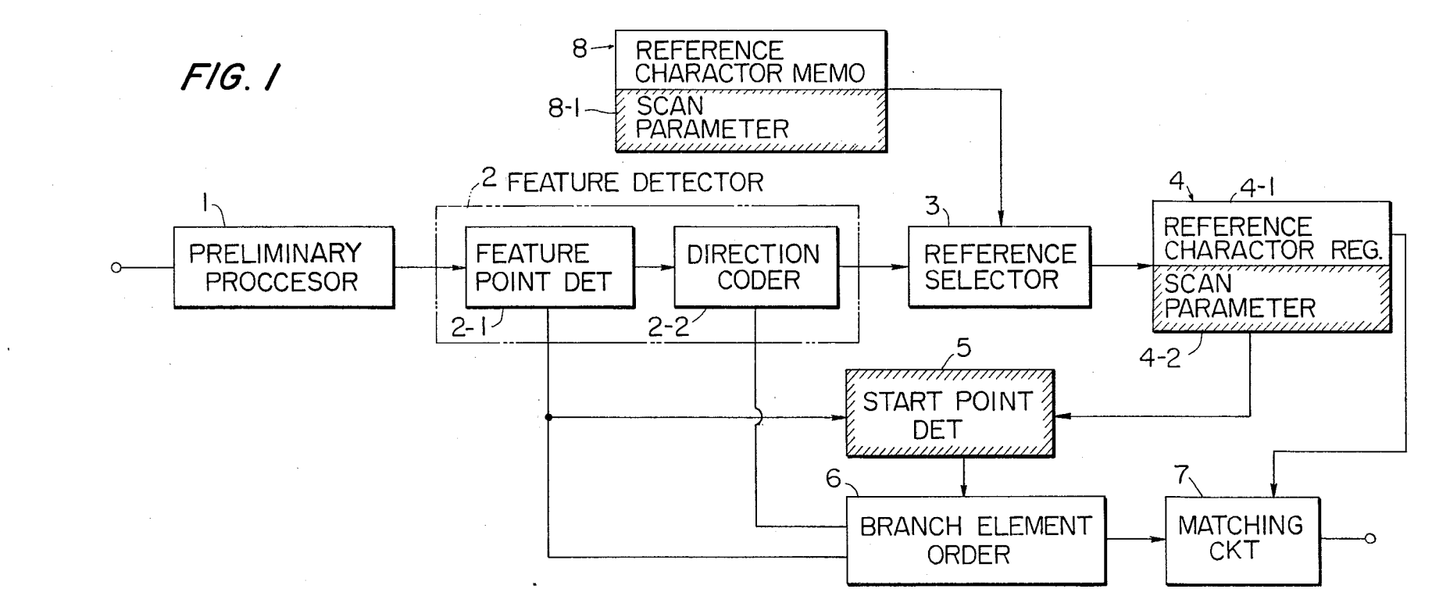
FIG. 1 is a block diagram showing a character recognition apparatus to which the present invention is applied.

FIG. 1 shows the structure of character recognition apparatus to which the present invention is applied, and which comprises a preliminary processing portion 1, a feature detecting portion 2, a reference character selecting portion 3, a selected reference character register portion 4, a starting point detecting portion 5, a branch element ordering portion 6 and a match processing portion 7.

In the system of FIG. 1, the portions, except the starting point detecting portion 5, and the scanning parameter portions 4—2 and 8—1 are known and substantially similar to those described in detail, for example, in the copending application of Mitsunori Oka, Ser. No. 327,157 filed Jan. 26, 1973, now U.S. Pat. No. 3,863,218, and that of Makihara et al, Ser. No. 403,391, filed Oct. 4, 1973, now U.S. Pat. No. 3,889,234, and assigned to the same assignee as the present application. For the sake of clarity, the operations of the known portions will be explained simply hereinafter.

Figure 2A:
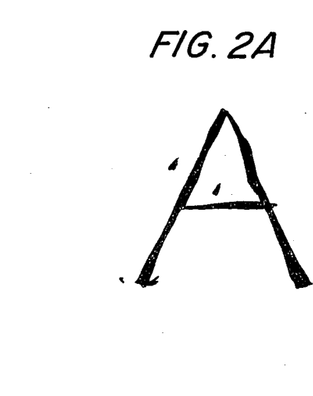
FIGS. 2A, 2B, and 2C are character patterns of the type processed by the system in FIG. 1.
Figure 2B:
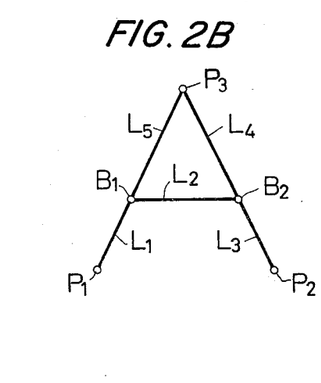
Figure 2C:
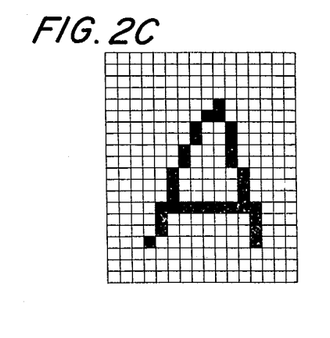

In the preliminary portion 1, a time variant analog signal obtained by an optical character reader ( OCR ) from an unknown character written on a paper, as shown in FIG. 2A, is changed into a binary value character pattern and stored in a matrix of storage cells, as shown in FIG. 2C, after rejecting noise components, normalizing the size and the position, and thinning the lines of the unknown character, as shown in FIG. 2B.

In feature detecting portion 2, comprising a feature point detecting circuit 2—1 and a direction code circuit 2—2, the feature point detecting circuit 2—1 detects the terminal points and branch or junction points of lines of the character from the binary value unknown character stored in the matrix of storage cells.

As shown in FIG. 2B, a character is generally composed of a number of lines, such as $L_1$, $L_2$ -$L_5$, each of which connects the two points selected from the terminal points $P_1$, $P_2$, $P_3$ and branch points $B_1$, $B_2$, that is feature points.

The sequence numbers and the coordinates of the detected feature points are stored in a register not shown. This register is called a feature point table hereinafter. On the other hand, the direction code circuit 2—2 extracts the information such as, the direction at the feature points, the line length, serial numbers etc. of the individual line element representing the individual line elements $L_1$, $L_2$, . . . $L_5$ terminated by the feature points, and stores them in another table in the form of a code signal together with the address thereof.

When the feature detecting circuit 2 finishes its operation making the two tables in which feature points and line elements are registered in the form of coded signals, the branch element ordering circuit 6 selects the code signals according to a predetermined rule, for example, according to a rule that the line element having a starting point selected from the plurality of terminal points, is determined as the first line element. The line element connected counter-clockwise at the other end of the first line element, is selected as the second line element, and the same selection method is followed at branching points for other line or branch elements so that all line elements forming a character may be arranged in sequential order.

The selected code signals are combined and transformed into a sequence of code signals, namely a code train.

Thereafter, this code train is transferred to the matching or comparing circuit 7. At the same time, the reference character selecting portion 3 selects a reference character to be compared with the unknown character from a reference character memory 8 and transfers the code train of the selected reference character into the reference character register 4—1 temporarily.

Finally, the code train from the branch element ordering portion 6 is successively compared with the other code train of the register 4—1 in the matching portion 7 and the reference character having a code train most similar to that of the unknown character is detected as the recognized character.

In conventional character recognition apparatus of the same type described above, the method for determining the start point in order to form the code train in the branch ordering portion 6 is the same for all characters. Accordingly there are the following problems.

For the understanding of this invention, the problems will be explained by the use of an example of a numeral character "4".

In order to form a code train for each character, it is necessary to connect a plurality of codes corresponding to the divided branch elements in a predetermined sequence.

Figure 3A:
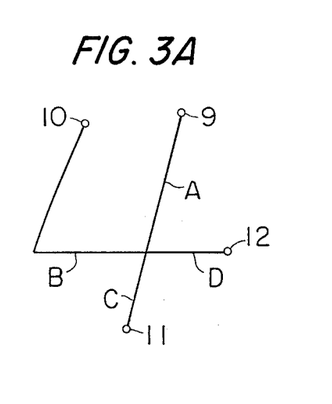
FIGS. 3A and 3B are character patterns of the hand written numeral "4".
Figure 3B:
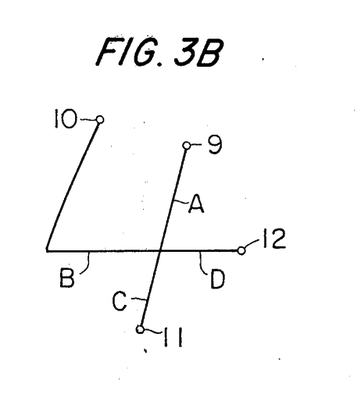

Therefore, first of all, it is necessary to select one of the terminal points as a starting point. Depending on the selection of the starting point, the code train obtained from one character becomes different. For example, when scanning for detecting a starting point uses the top to bottom scanning method for numeral character "4" as shown in FIG. 3A and 3B; in the case of FIG. 3A, the starting point is 9 and the branch elements are arranged in the order A—B—C—D according to the rule tracing branch element counterclockwise at a branch point as described above. On the other hand, in the case of FIG. 3B, the starting point is 10 and the branch elements are arranged in the order B—C—D—A according to the same rule.

For this reason, the two code trains of the numeral character "4" must be stored in the reference character memory in order to recognize correctly the unknown character shown as "4" in FIGS. 3A and 3B. The same applies to other characters.

Therefore, the capacity of the reference character memory must be large and the processing time for recognizing an unknown character is very long.

In accordance with this invention, in order to detect correctly and surely the starting point with only one scanning independently of the variety of the unknown characters due to the personality of the writer, the scanning parameter peculiar to each character is stored in the reference character memory 8—1 together with the code train, obtained by the scanning determined by the scanning parameter.

As shown in FIG. 1, in the reference character register portion 4—2, the scan parameter of the reference character to be compared is registered together with the code train thereof.

The starting point detecting portion 5 detects the starting point by scanning the terminal points of the feature points table in the scanning direction determined by the scanning parameter in the reference character register 4—2, The branch element ordering portion 6 forms a code train by using the starting point detected in portion 5.

Figure 4:
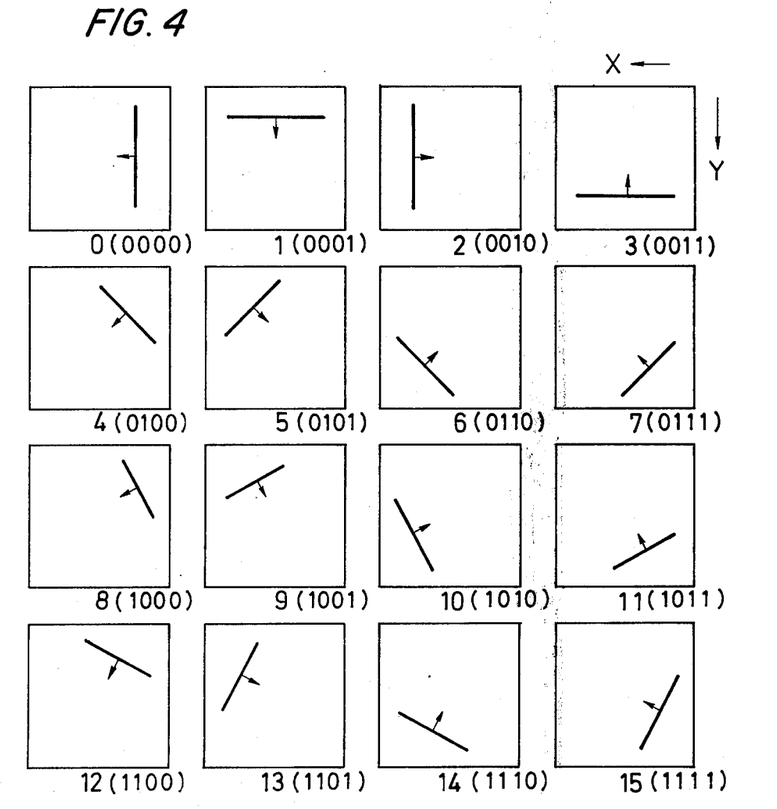
FIG. 4 is a diagram showing scanning directions.

FIG. 4 shows one embodiment of the scanning directions for detecting the starting point. Although 16 scanning directions are shown, it may be possible to increase or decrease the number of directions depending on the kind of character to be recognized. The numerals 0~15 under the squares are the parameters showing the scanning directions, that is, scan parameters, which, in practice, are coded as shown in brackets.

Figure 5:
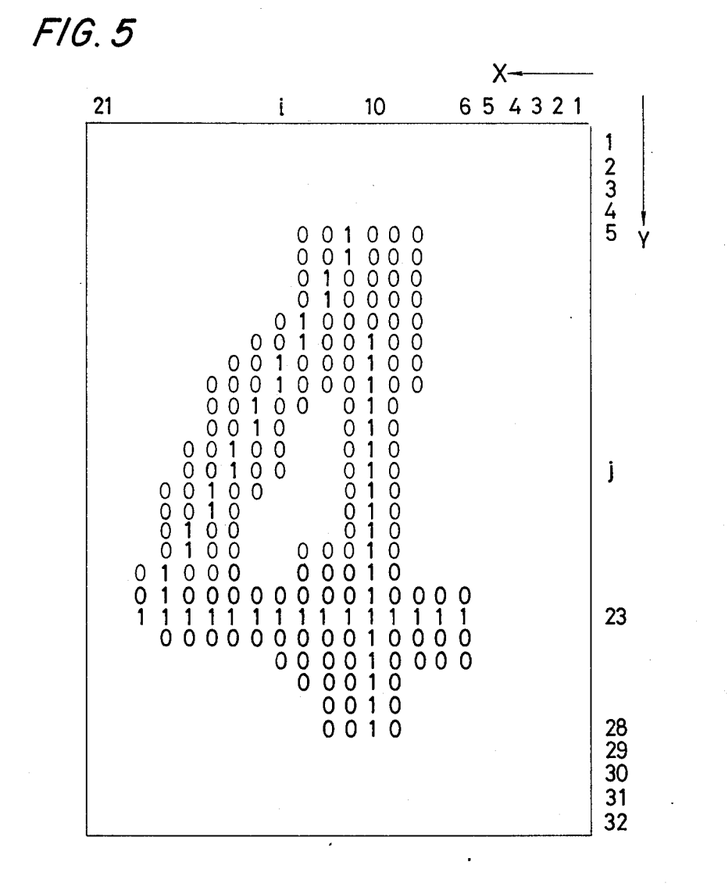
FIG. 5 is a two dimensional information pattern of binary values of the numeral character "4" in binary value matrix cells.

As an explanation of scan parameters, FIG. 5 shows one example of the two dimentional information stored in matrix form concerning a numeral character "4", after preliminary processing, which corresponds to one of the squares shown in FIG. 4, and in which binary values "1" represent the lines of the character.

As shown in the matrix of FIG. 5, the information on a character to be recognized is considered to be distributed over a rectangular matrix of 32× 21 cells, each of which can be represented by the coordinates, (X, Y), and in which there are four terminal points represented by the coordinates (11, 5), (10, 10), (6, 23) and (10, 28), and a branch point represented by the coordinates (10 , 23).

If the scanning is carried due to the parameter 0 (0000) shown in FIG. 4, each point of the matrix is scanned in the order (1, 1), (1, 2), (1, 3), — (1, 32), (2, 1), (2, 2), — (2, 32), (3, 1), (3, 2), — (3, 32) —. In the case of parameter 3 (0011), each point of the matrix is scanned in the order (1, 32), (2, 32) — (21, 32), (1, 31), (2, 31) — (21, 31), (1, 30) —. In the case of the scan parameter 4 (0100), each point of the matrix is scanned in the order (1, 1), (2, 1), (1, 2), (3, 1), (2, 2), (1, 3), (4, 1), (3, 2), —, the scanning orders in the other scanning parameters will be understood easily from the above examples.

The first point detected in the each scanning is the starting point for the numeral character shown in FIG. 4. For example, the starting point detected by the scanning parameter 3 (0011) for the numeral character "4" is the point of the cell represented by the coordinates (10, 28), and in the case of the parameter 0 (0000), the point of the cell represented by coordinates (6, 23) is the starting point.

Figure 6:
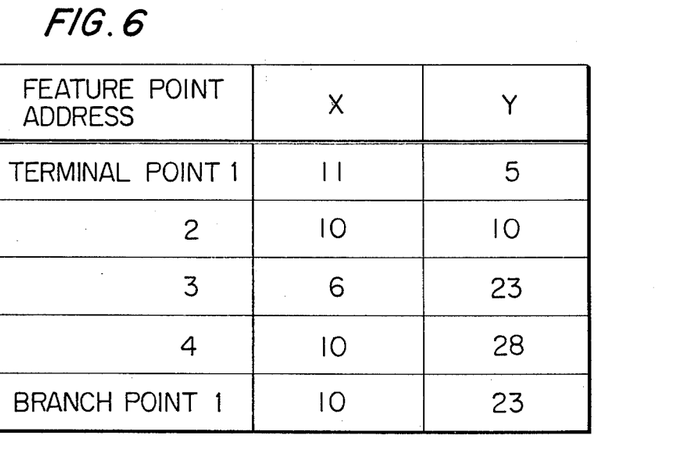
FIG. 6 is a table for explaining a feature point table used in one embodiment of this invention.

Although the above description in connection with FIG. 5 is conceptually explained for the understanding of the scanning parameter function in a practical character recognition apparatus, the terminal points and branch points are recorded in the feature point table in the form of coded signals representing the coordinates together with the addresses of the memories storing the coordinates as shown in FIG. 6.

Figure 7:
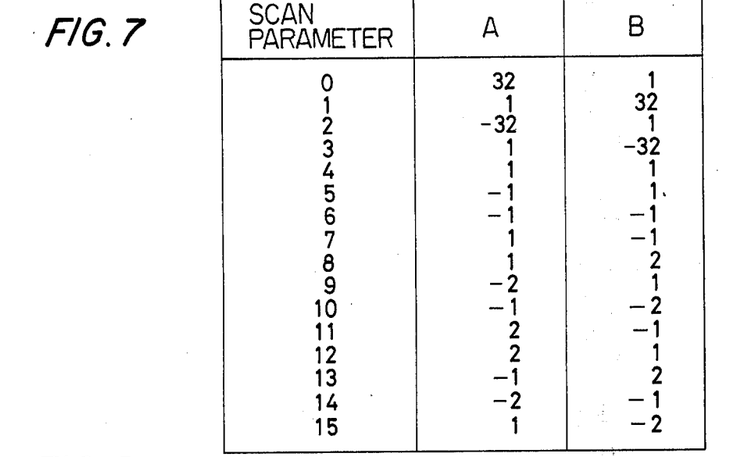
FIG. 7 is a table for explaining the scan parameter constants used in one embodiment of this invention.

Accordingly, the starting point can be detected by calculating $AX + BY$, in other words, it is the starting point that has the minimum value of $AX + BY$ of all terminal points, where A and B are constants representing the scanning direction and have the values shown in FIG. 7 which shows one example suitable for a matrix of $32 \times 21$ points and the scanning directions shown in FIG. 4. Needless to say the value of A and B can be replaced by other constants on the basis of the matrix and the scanning direction.

The operation and superiority over conventional apparatus of this invention will be seen in more detail by the following explanation using two examples of the cases of scan parameters 3 (0011) and 4 (0100).

When a scan parameter 3 is used for scanning the numeral character "4" shown in FIG. 5, the values of $AX + BY$ for terminal points 1,2,3 and 4 are represented by $-149 = 1 \times 11 + (-32) \times 5$, -310, -730, and -886 respectively. As the end point 4 has the minimum value, the end point is determined as the starting point.

However, in the case of scan parameter 4 (0100), the values of points 1,2,3 and 4 are 6,20,29 and 38 respectively. Therefore, point 1 is determined as the starting point.

As described before, in the character recognition apparatus in accordance with this invention, the scanning direction of an unknown character is varied in accordance with the reference character to be compared with the unknown character so that the starting point may be the same point for a certain unknown character in spite of the variety of shapes due to personal writing habits. For example, for the two numeral characters "4" shown in FIG. 3A and 3B, if the scanning parameter 1 (0001) is used, the starting point becomes different (9 and 10 in FIGS. 3A and 3B). However, when the scan parameter 3 (0011) is used, the starting points are the same (11) in both numerals characters "4" having different geometrical shapes. The same is true for other numeral shapes of character "4".

For this reason, the specific scan parameter to be assigned to a reference character is determined so that the starting point may not be changed due to varied writing habits.

Figure 8:
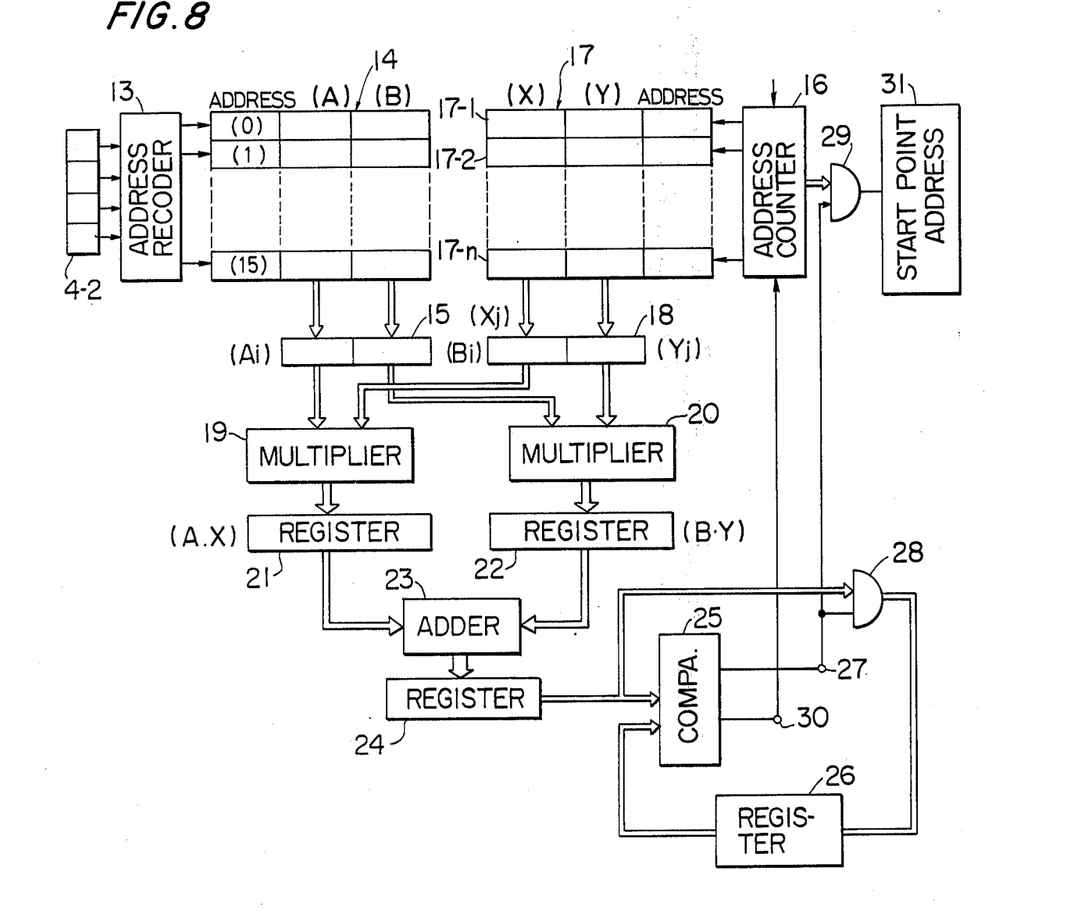
FIGS. 8, 9, and 10 are block diagrams showing embodiments of character recognition apparatus in accordance with this invention.

FIG. 8 is a schematic diagram showing the construction of one embodiment of the start point detecting portion in accordance with this invention.

When the code train and the scan parameter of a reference character are stored in register 4 in FIG. 1, the start point detecting portion 5 begin operation. The scan parameter in register 4—2, which consists of 4 bits, is transferred into an address recoder 13 in which the scan parameter is changed into the address signal representing the address of a memory storing the constants $A_i$ and $B_i$ corresponding to the scan parameter. Thereafter, the constants $A_i$ and $B_i$ are accessed by the address signal from the memory, which stored the constants shown in FIG. 7, and the constants $A_i$ and $B_i$ accessed are transferred into a memory register 15. At the same time, the first address signal representing the address of a memory 17—1 storing the coordinates $(X_1, Y_1)$ of the first terminal point 1, is set in the address counter 16. Thereafter, the coordinates $(X_1, Y_1)$ signals are accessed by the address signal in the address counter 16 from the memory 17—1 and are transferred into a memory register 18. The memory 17 having memory elements 17—1, 17—2 —17—n is the feature point table described above.

The signal $A_i$ of the memory register 15 and the signal $X_1$ in the memory register 18 are guided into a multiplier 19, and the signal $B_i$ in the memory register 15 and the signal $Y_1$ in the memory register 18 are guided into a multiplier 20.

The outputs of the two multiplier are transferred into memory registers 21 and 22 respectively, and further guided to an adder 23 which calculates the sum of the two out puts of memory registers 21 and 22. The out put $(A_i X_i + B_i Y_1)$ of the adder is stored in a memory register 24.

The out put signal from the register 24 is guided to a comparator 25, in which the value of the memory register 24 is compared with the value memorized beforehand in a memory register 26.

If the value $A_i X_1 + B_i Y_1$ is not larger than the value memorized beforehand, for example, $10^4$, a signal is generated on terminal 27 and opens a gate 28 from which the out put signal is inserted in the register 26. At the same time, the out put signal on the terminal 27 opens the other gate 29 and drives the address counter 16 so as to count up by one. Therefore, the address of the memory storing the coordinates $(X_1, Y_1)$ is registered in the start point memory 31.

On the other hand, if the value $A_i X_1 + B_i Y_1$ is larger than the predetermined value stored in the register 26, the output signal is generated on terminal 30 and the address number in the address register 16 is increased by one.

When the address number corresponding to the second terminal point accesses the coordinates $(X_2, Y_2)$ and transfers them into the memory register 18, the processing for calculation of $A_i X_2 + B_i Y_2$ is carried on according to the same process described in the case of $A_i X_1 + B_i Y_1$. If the value $A_i X_2 + B_i Y_2$ is larger than that stored in register 26, the value of register 26 is not changed and the address number of the addresscounter 16 is further increased by one. On the other hand, if the value $A_i X_2 + B_i Y_2$ is not larger than the value stored in the register 26, the value of register 26 is replaced by $A_iX_2+B_iY_2$, and the address stored in start point address register 31 is replaced by the new address.

When the calculation for all terminal points, that is, for all coordinates 17—1, — , 17—n are completed, the address signal stored in the start point address register 31 represents the address of the memory element having the coordinates which provide the minimum value of $A_iX + B_iY$.

Returning to FIG. 1 in the branch ordering portion 6, the code train of an unknown character can be formed by the use of the starting point detected in the starting point detecting portion 5. Thereafter the code train of the unknown character is transferred into the match processing circuit 7 and compared with the code trains of the reference characters from the reference character register 4—1 by a method similar to the conventional apparatus. When the comparison with one reference character ends, the code train and the scan parameter of another reference character is selected at portion 3 in FIG. 1 and are transferred into the registers 4—1 and 4—2 respectively. Thereafter, the start point of the unknown character is detected by the use of the scan parameter of the new reference character by the same proccess described above.

The same processes are repeated for all reference characters.

Figure 9:
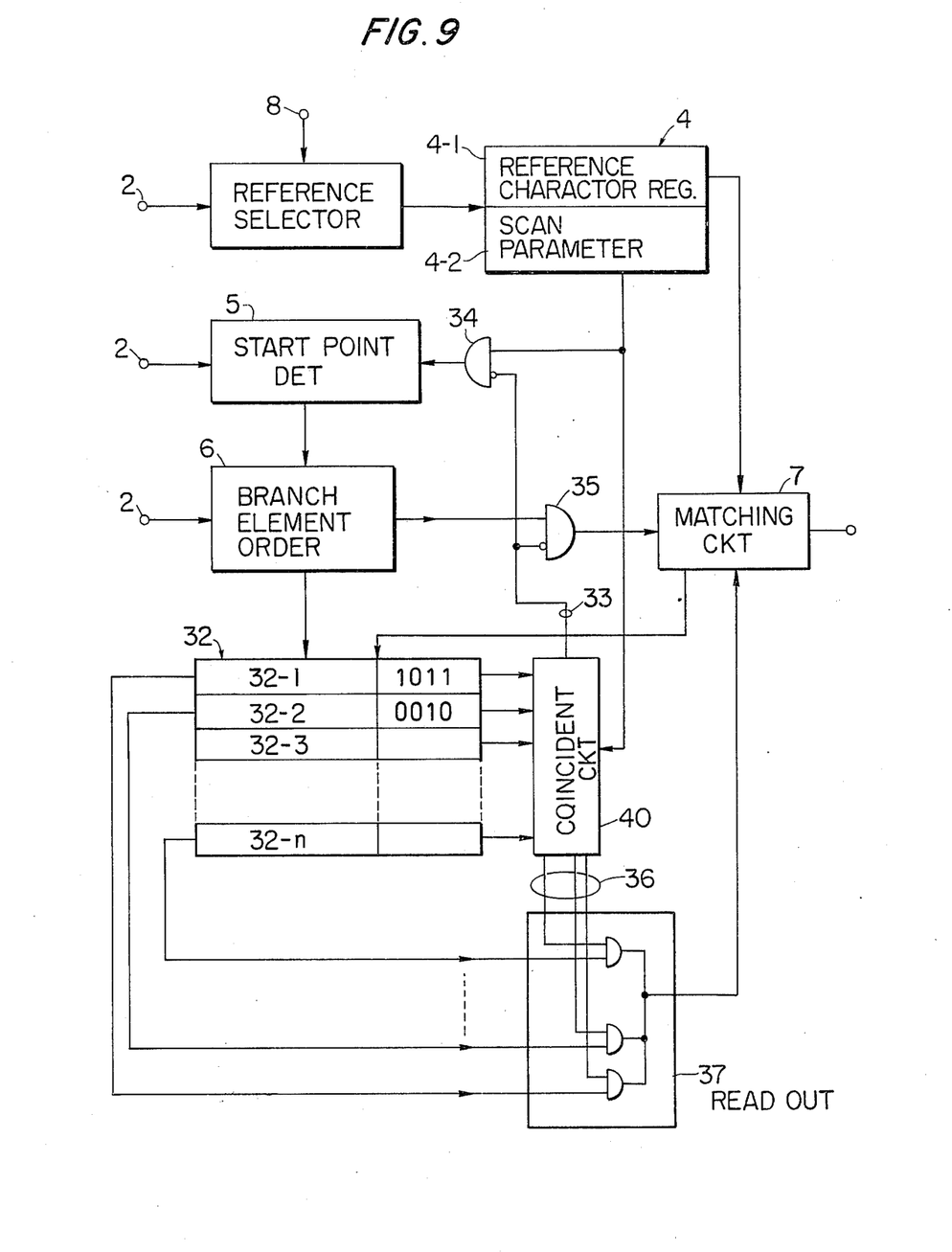

FIG. 9 is a block diagram showing another embodiment in accordance with this invention. This embodiment is so constructed that, when a reference character having the same scan parameter as that of the reference character processed beforehand is generated, the code train of the unknown character obtained before is used without the operation of the start point detecting portion 5. In FIG. 9, portions designated by the same numerals as those of FIG. 1 are substantially the same as those of FIG. 1.

The block designated by numeral 32 is a code train register in which the code train of the unknown character to be recognized is stored with the scan parameter when the scan parameter is generated for the first time during the processing of the unknown character. The code trains in the code train register 32 are eliminated at the time when the recognition for the unknown character is completed.

When a scan parameter of the reference character to be compared is stored in the register 4—2, the scan parameter is guided to the coincident circuit 40, and is examined to determine whether or not the same scan parameter has existed before.

If the same scan parameter as that of the register 4—2 exists, the output of the coincident circuit on terminal 33 closes gates 34 and 35. At the same time, an out put signal on one of a plurality of lines 36, each of which corresponds one of the register elements 31—1, 32—2, — or 31—n is applied to the read out circuit 37 and opens the corresponding gate for the scan parameter in the read out circuit 37.

Also, if there exists no scan parameter in the memory 32 equal to that of the register 4—2, the out put on terminal 27 (FIG. 8) opens gates 34 and 35, and closes the read out circuit 37.

Accordingly, the start point circuit 5 and the branch element ordering circuit 6 operates in the same manner described for the embodiment shown in FIG. 8 and the out put or the code train of the unknown character is transferred into the matching circuit 7, and is stored in the memory 32 together with its scan parameter.

When the recognition is completed for one unknown character, the signal from the matching circuit 7 indicating the end of the operation is added to the memory 32 and eliminates the code trains and the scan parameters.

Figure 10:
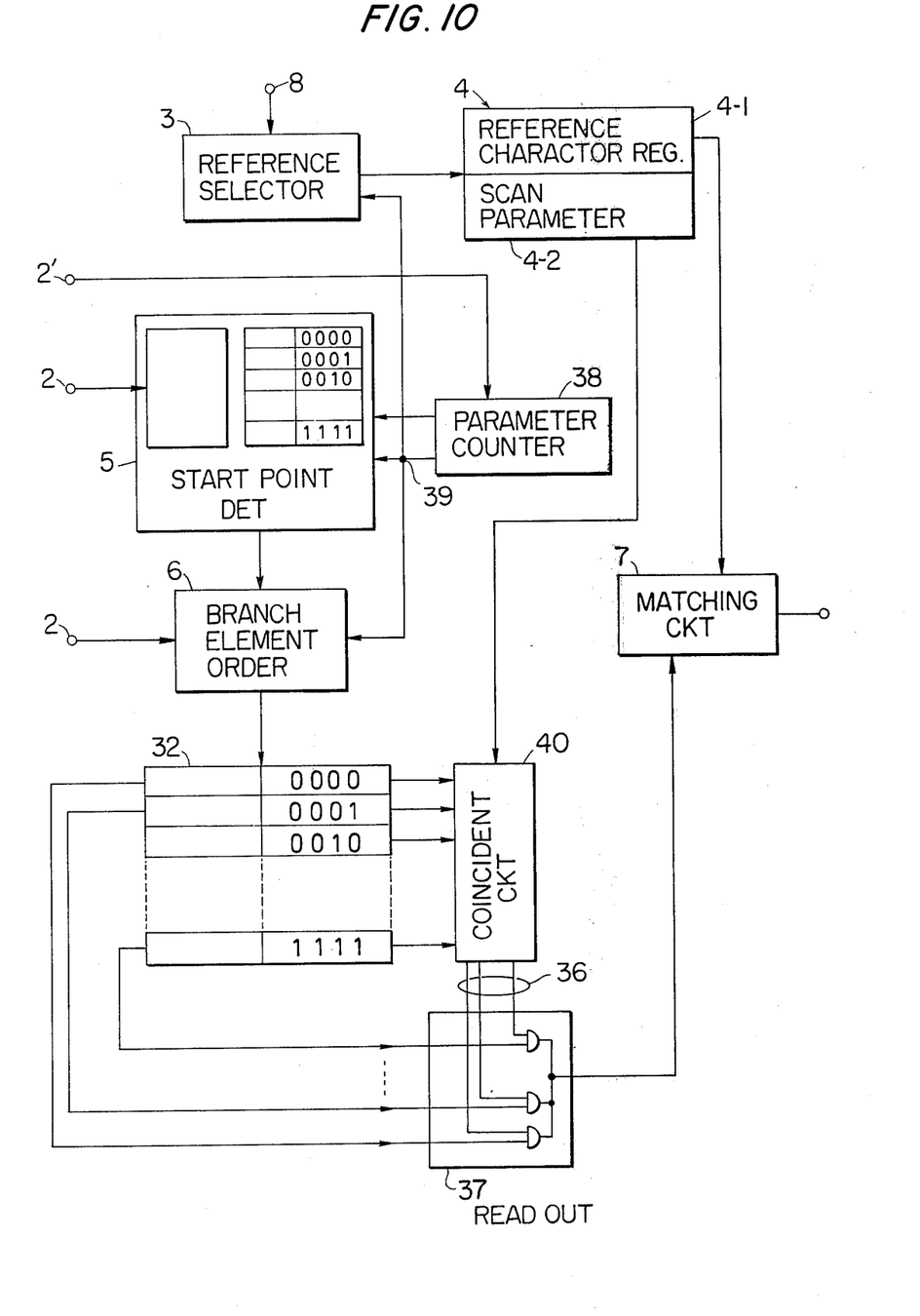

FIG. 10 is a block diagram showing the other embodiment in accordance with this invention. This embodiment is so constructed that the code trains of an unknown character corresponding to all scan parameters are made at first and stored in an unknown character code memory 32 before the start of the matching operation. In FIG. 10, blocks designated by the same numerals as those in FIGS. 1 and 9 have substantially the same constructions and operations as those in FIGS. 1 and 9.

When the feature points of an unknown character are detected, a signal representing the terminal of the feature point detecting is added through a terminal 2 to a scan parameter counter 38, which produces successively a series of scan parameters such as 0000, 0001, 0010, — 1111.

The start point detecting circuit 5 and the branch element ordering circuit 6 produce a series of code trains concerning the unknown character in accordance with the series of scan parameters from the counter 38 by the processing operation described in connection with FIG. 8.

The series of code trains are stored in order in the unknown character memory 32. When all code trains of one unknown character corresponding to all scan parameters are stored in the memory 32 the counter 38 produces a signal to stop the operation of the start point detecting circuit 5 and the branch element ordering circuit 6 and to start the operation of the reference character selecting circuit 3 and the scan parameter stored in register 4—2, is compared with the scan parameters of the memory 32 in a coincidence circuit 40, and one code train stored in the memory element having a scan parameter coincident with that of scan parameter register 4—2 is read out through a read out circuit 37 by the operation described in connection with FIG. 9.

Each time the matching operation comparing an unknown character with one reference character is completed, a new reference character is transferred into the register 4, and the operation described above is repeated.

When the recognition for one unknown character ends, the code trains and the scan parameter are eliminated, and the same operations described above are repeated each time two dimensional information of a new unknown character is provided.

While this invention has been shown and described with reference to a few preferred embodiments thereof, it will be understood by the skilled in the art that various changes in form and detail may be made therein without departing from the spirit and scope of this invention.

We claim:

1. Character recognition apparatus comprising:
    a. preliminary processing means for obtaining two dimensional binary information representing an unknown character and for storing such information in matrix form;
    b. feature detecting and storage means for detecting terminal points, branch points and line elements of the unknown character from said two dimensional information stored by said preliminary processing means and for providing code signals representing such information;

c. reference character memory means for storing scan parameters particular to each of a plurality of reference characters together with a code train of said reference characters obtained by the use of the associated scan parameters;

d. start point detecting means responsive to said feature detecting and storage means for selecting one of the terminal points of said unknown character as a start point based on the associated scan parameter of a reference character selected from the reference character memory means;

e. processing means for combining code signals representing the line elements stored in said feature detecting and storage means and converting them into a code train on the basis of the start point selected by said start point detecting means; and f. comparing means for comparing the code train of the unknown character with that of the selected reference character.

2. A character recognition apparatus according to claim 1, wherein the start point detecting circuit comprises table memory means for storing a plurality of constants A and B representing scanning parameters, first circuit means for storing coordinates (X, Y) of the terminal points and branch points of each feature of the unknown character, second circuit means for selecting one pair of constants (A, B) stored in said table memory means in accordance with the designated scan parameter of a selected reference character to be compared, and third circuit means for determining the terminal point having the minimum value of $AX + BY$ with respect to the coordinates stored in said first means and for designating that terminal point as a start point.

3. Character recognition apparatus according to claim 1, wherein there is further provided code train memory means for selectively storing the code trains produced from said processing means together with the scan parameters corresponding to the code trains to be stored, first means responsive to said reference character memory means for comparing the scan parameter of a selected reference character with the scan parameters stored in said code train memory means, and second means responsive to said first means for selectively reading out the code train from the stored code trains associated with the corresponding scan parameter and for forwarding said code train to said comparing means.

4. Character recognition apparatus according to claim 3, wherein there is further provided third means responsive to operation of said second means for inhibiting operation of said start point detecting means and said processing means.

5. Character recognition apparatus according to claim 1, wherein there are further provided code train memory means for storing code trains corresponding to all scanning directions of the unknown character produced from said processing means, and read out means for selecting one code train coinciding with the scan parameter of a selected reference character and for forwarding said code train to said comparing means.

* * * * *